United States Patent [19]

Legoy et al.

[11] 4,076,260

[45] Feb. 28, 1978

[54] SEALING DEVICE FOR ROTARY MACHINES CONTAINING HYDRAULIC FLUID

[76] Inventors: Auguste Legoy; Claude Legoy, both of 12 bis rue Rene Coty, Montivilliers, France 76290

[21] Appl. No.: 765,285

[22] Filed: Feb. 3, 1977

[30] Foreign Application Priority Data

Feb. 4, 1976 France .............................. 76 03127

[51] Int. Cl.² .......................... F16K 41/00; F16J 15/42
[52] U.S. Cl. .......................................... 277/25; 277/3; 277/59
[58] Field of Search ..................... 277/25, 27, 3, 15, 59

[56] References Cited

U.S. PATENT DOCUMENTS

| 2,352,336 | 6/1944 | Martin et al. | 277/25 |
| 2,494,971 | 1/1950 | Summers | 277/25 |
| 2,665,929 | 1/1954 | Sawyer | 277/25 X |
| 2,823,052 | 2/1958 | Collman | 277/15 X |

FOREIGN PATENT DOCUMENTS

507,842  6/1939  United Kingdom .................. 277/25

*Primary Examiner*—Robert S. Ward, Jr.
*Attorney, Agent, or Firm*—Scully, Scott, Murphy & Presser

[57] ABSTRACT

A sealing device for rotary machines containing hydraulic fluid, such as centrifugal pumps, compressors, steam turbines and the like. An annular gasket/valve has a flexible lip which seals around the pump or other type machine shaft when the machine is inoperative. An annular sealing chamber is defined between the gasket/valve and an annular cavity defined inside a hollow rotary body fixed around the end of the shaft to be sealed. When the machine shaft rotates at normal speed, the sealing chamber is filled with liquid so that leakage flow is delivered to the annular cavity whereby a liquid ring is formed by centrifugal force around the outer periphery of the cavity. Recovery means in the form of a pitot tube keeps the depth of the liquid ring constant and restores excess liquid to the sealing chamber.

8 Claims, 13 Drawing Figures

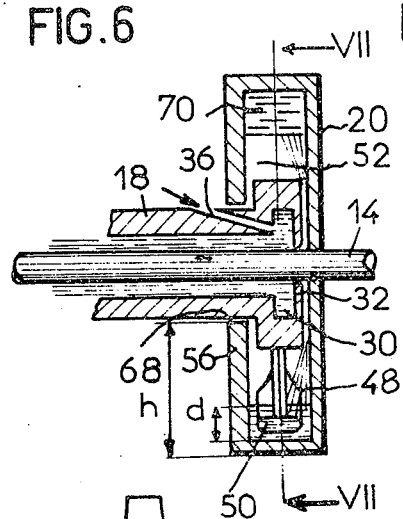
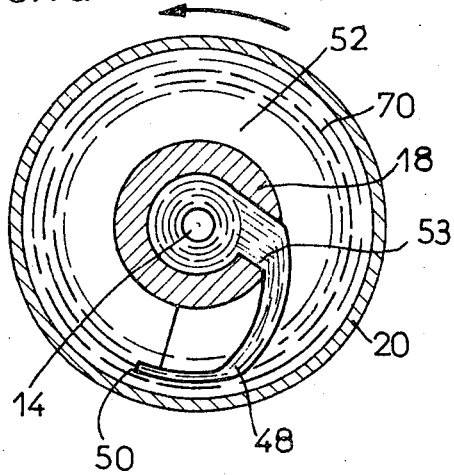
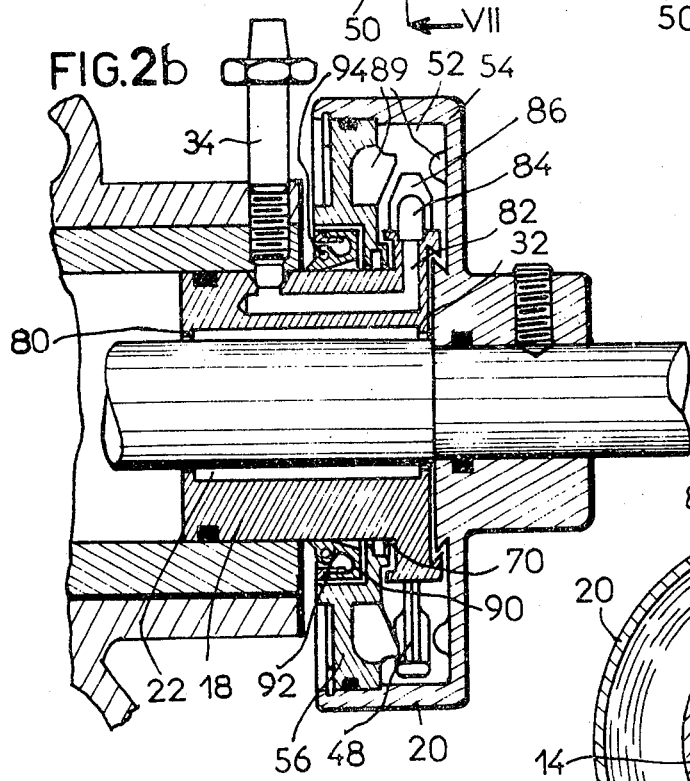
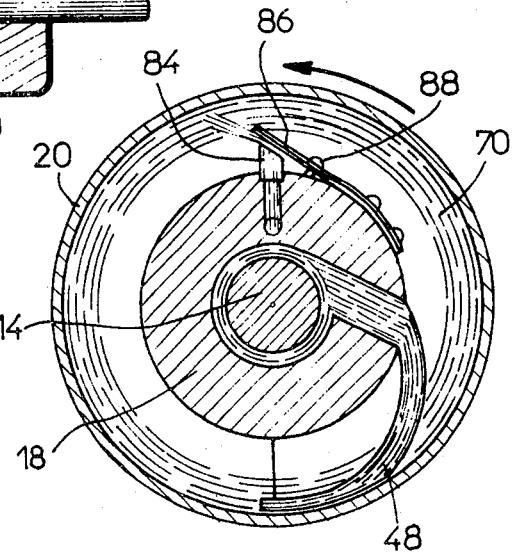

SEALING DEVICE FOR ROTARY MACHINES CONTAINING HYDRAULIC FLUID

The present invention relates to a new sealing device for rotary machines containing hydraulic fluid, such as centrifugal pumps, compressors, steam turbines etc.

In order to prevent leakages of hydraulic fluid as well as the intake of air at the points where the shaft leaves the body of a centrifugal pump, one generally uses stuffing-boxes comprising packings of various materials, as well as pressing means controlled by screws for ensuring screwing-down of the packings.

However, stuffing-boxes have the considerable drawback of causing wear of the pump shaft or the linings in which the latter rotates. In addition, in the case of water pumps, the stuffing-boxes deteriorate very quickly, which results in a poor seal in the region of the points where the shaft leaves the pump body.

The present invention intends to remedy these drawbacks. In a centrifugal pump, of the type comprising a casing, a shaft leaving said casing at at least one point of the latter and a device for ensuring the seal at this point, the improvement according to the invention resides in the fact that said sealing device comprises, firstly, an annular gasket/valve, provided with a flexible lip whereof one face is turned towards the suction side of the pump and which is able to be applied normally with sealed contact around the shaft, when the pump is inoperative and secondly, an annular sealing chamber defined between the shaft and the casing or a fixed part integral with said casing, said sealing chamber being connected, on the one hand, to the side of the gasket lip opposite the first said side and on the other hand, to an annular cavity defined inside a hollow rotary body fixed in a sealed manner around the end of the shaft to be sealed and fitting with clearance around the casing or said fixed part integral with the casing, valve means being provided for connecting the delivery side of the pump to said sealing chamber, when the pump rotates at normal speed, such that said sealing chamber is permanently filled with a liquid at a pressure equal to the delivery pressure, so that the gasket/valve is separated from the shaft and that a leakage flow is delivered to said cavity of the rotating body where it forms a liquid ring pressed under the effect of the centrifugal force against the outer periphery of said cavity, recovery means being provided for keeping the depth of said liquid ring constant and restoring the excess liquid to said sealing chamber.

Said recovery means may be constituted by a Pitot tube comprising a collecting end immersed in the peripheral liquid ring and turned to face the direction of rotation of said liquid ring and an outlet end which opens inside said sealing chamber.

Thus, when stopped, the seal of the pump is ensured by the gasket/valve which closes on the shaft, in view of the face that the pressure is thus higher in the direction passing from the suction side of the pump towards the gasket/valve. When the pump is operated at its normal speed and the valve means are open, the gasket/valve opens and provides a passageway for the fluid which arrives from the delivery side of the pump, via said sealing chamber. The result of this is that during rotation, the seal is ensured exclusively by the liquid gasket which fills the sealing chamber. In view of the fact that this sealing device causes neither friction of the gasket/valve on the shaft, nor friction of the metal parts against each other, there is not wear or seizing of the parts. The seal thus obtained is perfect on pumps in which the pressures are of the order of 0 to 10 bars/cm² for a speed of the order of 3,000 rpm.

Two embodiments of the invention will now be described, as non-limiting examples, with reference to the accompanying drawings in which:

FIG. 2b is an axial sectional view corresponding to FIG. 2a, in the case of a centrifugal pump whose suction pressure is negative;

FIG. 3a is a sectional view on line III—III of FIG. 4a;

FIG. 4a is an enlarged axial sectional view of a detail of FIG. 2a;

FIG. 6 is an axial sectional view explaining diagrammatically the operation of the sealing device according to the invention;

FIG. 7a is a sectional view on line VII—VII of FIG. 6 and

FIG. 7b is a view similar to FIG. 7a and explaining the operation of the sealing device of FIG. 2b.

The following description relates to a centrifugal pump, but it also applies to compressors, steam turbines and other apparatus of this type, on condition of slight modifications within the scope of a man skilled in the art.

Figure 1:
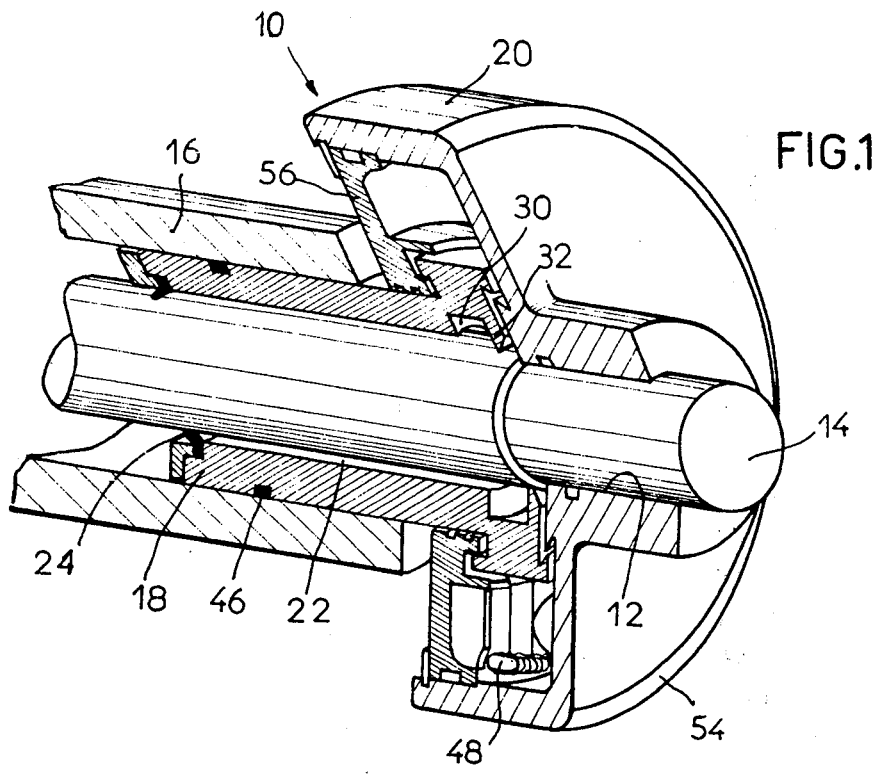
FIG. 1 is a perspective view of an axial section showing the sealing device according to the invention, mounted at the end of a shaft of a centrifugal pump, which is not shown, the suction pressure of which is positive.
Figure 2A:
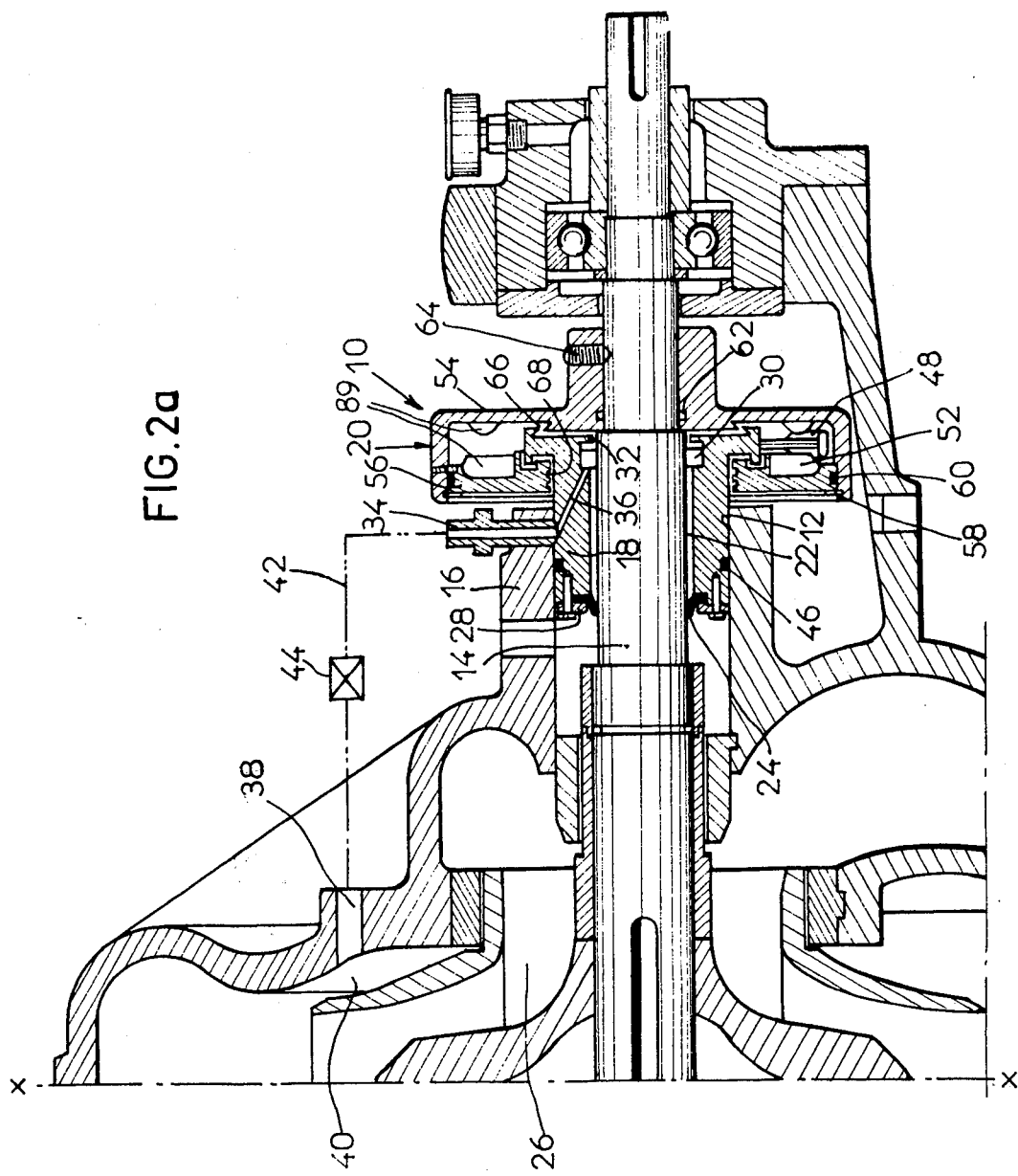
FIG. 2a is a partial view, in axial section, of the sealing device and of the centrifugal pump.
Figure 2C:
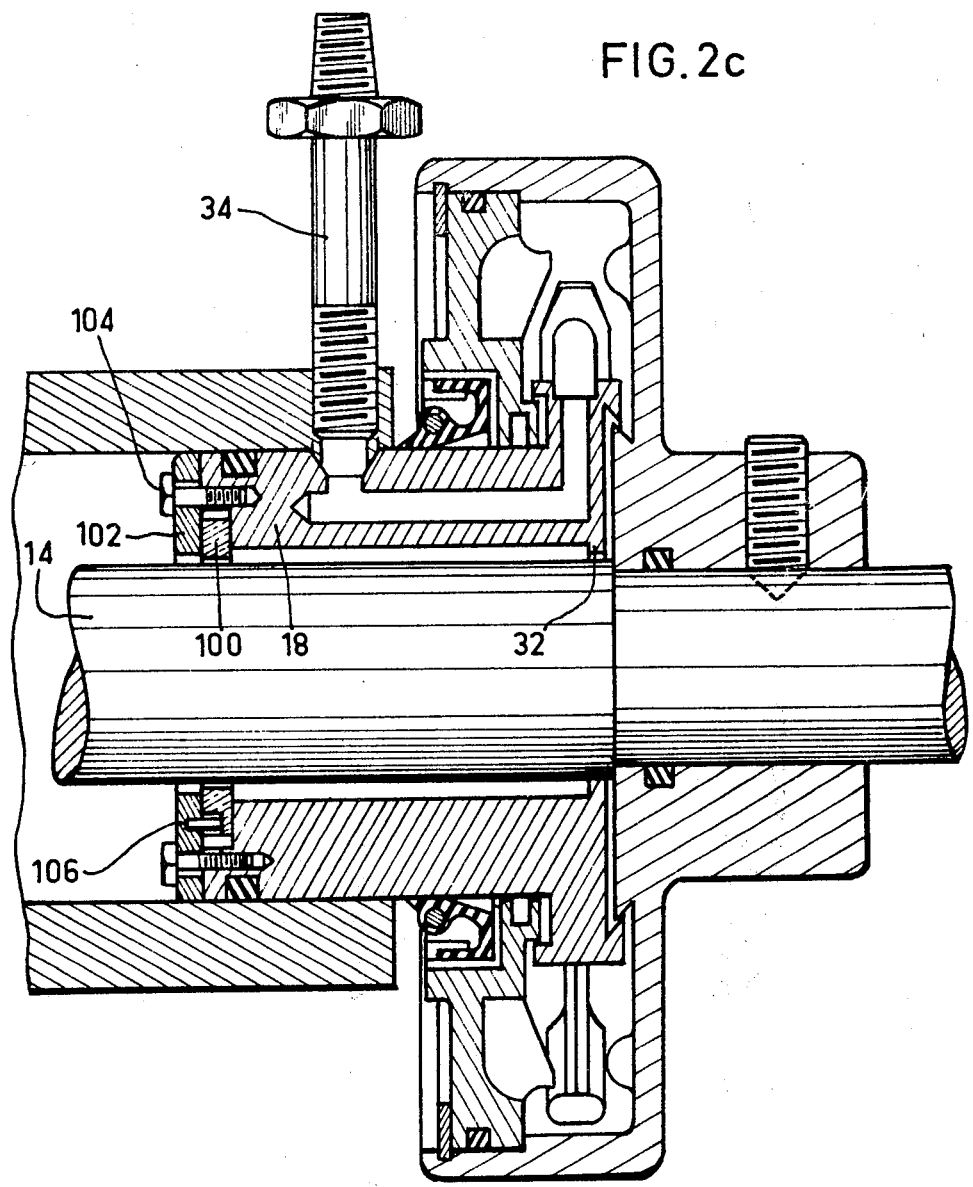
FIG. 2c is an enlarged view of the sealing device shown in FIG. 2b.
Figure 3B:
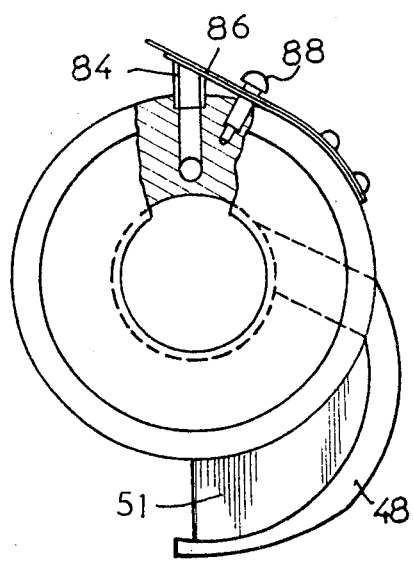
FIGS. 3b, 4b and 5b are views corresponding to FIGS. 3a, 4a and 5a, of different details of FIG. 2b.
Figure 4B:
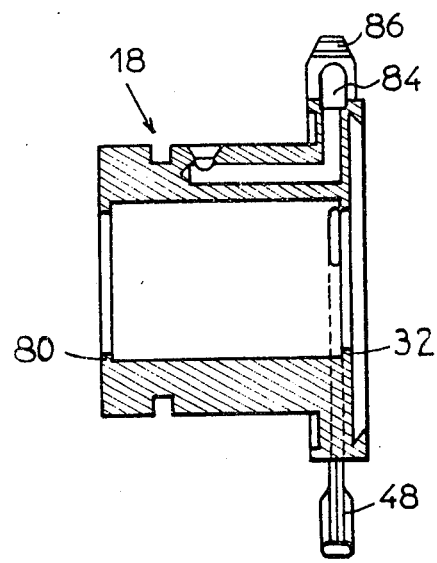
Figure 5A:
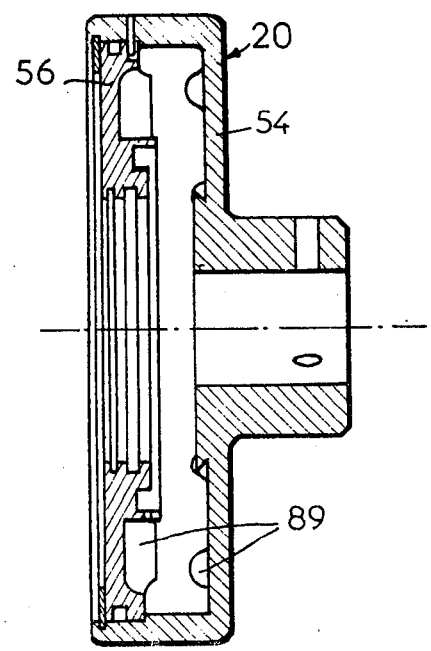
FIG. 5a is an enlarged axial sectional view of another detail of FIG. 2.
Figure 5B:
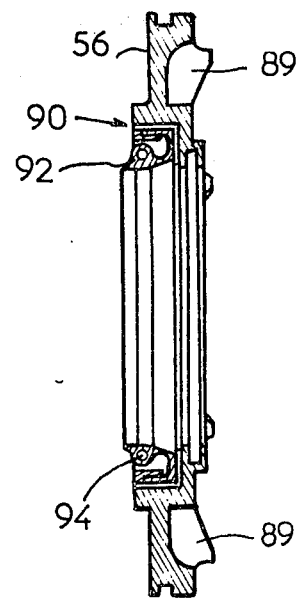

With reference to FIGS. 1 and 2a, the sealing device 10 according to the invention is used for ensuring the seal at the orifice 12 through which the shaft 14 leaves the casing 16 of a centrifugal pump. FIG. 2a shows the line x—x as the axis of symmetry, such that the ensuing description is identical for the other symmetrical part which is not shown.

As shown in FIGS. 1 and 2a, the sealing device comprises a fixed sleeve 18 mounted coaxially with respect to the shaft 14, in the orifice 12 of the casing 16 and a hollow rotary body 20, connected to rotate with the shaft 14.

The sleeve 18 has an inner diameter greater than the diameter of the shaft 14, such that a tubular passage 22 is defined between the sleeve and the shaft. The end of the sleeve which is engaged in the orifice 12 supports an annular gasket/valve 24 provided with a flexible lip which normally closes on the shaft 14, consequently isolating the tubular passage 22 from the suction side 26 of the centrifugal pump. The gasket/valve 24 is fixed to the sleeve by means of a flange 28.

At the other end of the sleeve, the tubular passage 22 flares out to form with the shaft 14, an annular sealing chamber 30 which is limited, adjacent said other end, by a diaphragm 32 forming a clearance of several tenths of a millimeter with the shaft 14, in order to facilitate the free rotation of the shaft whilst limiting the leakage of the fluid contained in the tubular passage 22.

The sleeve 18 is fixed in the orifice 12 by any appropriate means, for example by means of screws, as well as by a tubular connection 34 fixed in the sleeve, at the end of a channel 36 provided in the sleeve and opening into the annular sealing chamber 30. The connection 34 connects the annular sealing chamber 30 to an orifice 38 located on the delivery side 40 of the pump, by means of a pipe 42 and a limited flow valve 44. An annular gasket 46 ensures the seal between the sleeve 18 and the casing 16.

Figure 3A:
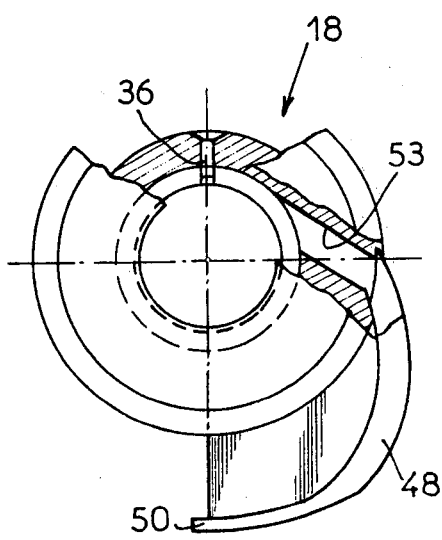
Figure 4A:
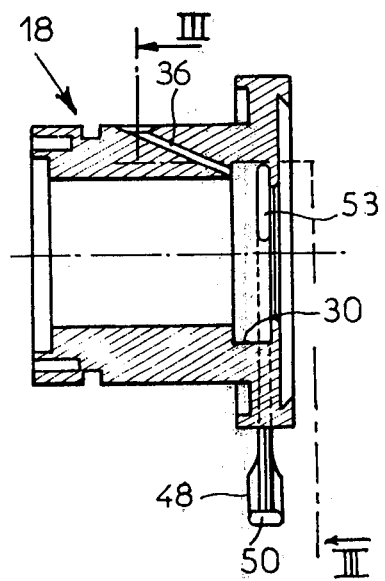

The sleeve 18 supports a Pitot tube 48 (FIGS. 3a and 4a) in the shape of an arc of a circle, whose collecting orifice 50 is located in a cavity 52 in the rotary body 20 in the vicinity of the radially outer periphery of said cavity. The outlet orifice 53 (FIGS. 3a and 7a) of the Pitot tube opens into the annular sealing chamber 30 in the sleeve 18.

The rotary body 20 is composed of a cup-shaped part 54 and a flat annular part 56, both centered on the shaft 14 and interconnected by means of a circlip 58 in the region of their outer periphery. Annular gaskets 60 and 62 ensure the seal respectively between the parts 54 and 56 on the one hand and between the part 54 and the shaft 14 on the other hand. The cup-shaped part 54 is connected to rotate with the shaft 14 by means of screws 64. It overlaps with the free end of the sleeve 18 to form a passage having a high pressure drop, for example a zig-zag passage. The inner periphery of the annular part 56 is fitted with clearance around the sleeve 18 and no particular seal needs to be provided in the gap 68 formed between these two members.

The operation of this sealing device is as follows:

When the pump is stopped, the rotary body 20 of the device is partly filled with liquid. As soon as the pump begins to operate, under the effect of the centrifugal force, the liquid is displaced to the outer periphery of the cavity 52 of the rotary body 20 and at this point forms a liquid ring 70 (FIGS. 6 and 7a) which remains trapped between the sides of the rotary body.

When the pump has reached its normal speed of rotation, the limited flow valve 44 is opened (FIG. 2a), which is located on the supply manifold for the annular sealing chamber 30 (the manifold being located between the delivery side 40 of the pump and the device 10). The liquid under pressure which is located in the delivery side thus fills the annular sealing chamber 30 and the tubular passage 22 via the pipe 42, the connection 34 and the channel 36 (FIGS. 2a, 6 and 7a). In view of the fact that the pressure at the delivery side is greater than that at the suction side 26 of the pump, the gasket/valve 24 is separated from the shaft 14. On the other hand, a leakage of liquid takes place from the annular sealing chamber 30 through the diaphragm 32 and zig-zag passageway 66. The latter introduce a pressure drop which limits the size of the leakage. As shown in FIG. 6, the liquid resulting from the leakage is injected into the chamber 52 and increases the width $d$ of the liquid ring 70. Due to this, the collecting orifice 50 of the Pitot tube 48 is completely immersed in the liquid ring 70. In known manner, the Pitot tube comes into action to establish equilibrium between the pressure prevailing in the annular sealing chamber 30 and the pressure resulting from the centrifugal force of the liquid ring 70. As soon as this equilibrium is achieved, any increase in the depth of the liquid ring 70 destroys the equilibrium and the volume corresponding to this increase is delivered by means of the Pitot tube, to the annular sealing chamber 30 and the equilibrium is restored.

Thus, the depth of the liquid ring 70 remains virtually constant. The sections of the Pitot tube 48 are calculated such that the depth $d$ of the liquid ring is less than the height H of the disc-shaped part 56. In this way, there is no danger of the liquid of said ring escaping through the unsealed gap 68.

The liquid which fills the annular sealing chamber 30 and the tubular passage 22 ensures the seal of the orifice 12. On the other hand, heating due to rotation is neutralised by the circulation of liquid taken from the delivery side 40.

For centrifugal pumps in which the suction pressure is negative, the sleeve and flat annular part are modified as shown in FIGS. 2b, 3b, 4b, 5a and 5b.

In the description of this embodiment, the parts will be given the same reference numerals as identical parts in the preceding embodiment.

The sleeve 18 no longer comprises a gasket/valve, since even during storage of the pump, the liquid located in the sealing device tends to regain the suction of the pump. The gasket/valve is replaced by a second diaphragm 80 which restricts the section of the tubular passage 22 towards the suction side. The cavity 52 of the rotary body is supplied with the liquid from the delivery side by means of the connection 34, passage 82 provided in the body of the sleeve and a nozzle 84 which opens into the cavity 52 and whose orifice is controlled by a spring strip 86 (FIG. 7b) fixed to the sleeve 18. A regulating screw 88 is provided for regulating the aperture of the nozzle.

The flat annular part 56 differs from that of the preceding embodiment in that it is provided on its inner periphery with a gasket 90 provided with a resilient lip 92 which, when the pump is stationary, tightens on the sleeve 18, which prevents the intake of air into the pump through the gap 68 and thus draining of the pump. The lip is provided on its circumference with small lead balls 94 which, under the action of the centrifugal force, are able to lift the lip by several tenths of a millimeter, during rotation of the pump.

During operation, the Pitot tube 48, whose rate of flow is chosen to be greater than that of leakages through the diaphragms 32 and 80, keeps the tubular passage 22 under pressure and prevents any entrance of air into the pump. The supply of the liquid ring 70 takes place directly. The spring strip 86 is biased simultaneously by the opposing actions of the pressure of the liquid ring and that of the liquid injected through the nozzle. Its opening position is adjusted in advance in order that th depth of the liquid ring is constant. Any increase in the depth of this ring destroys the equilibrium of the spring strip 86. The equilibrium is only restored when the Pitot tube 48 has delivered the excess liquid in the annular passage 22.

It will be noted that during rotation, under the effect of the centrifugal force, the lip 92 of the gasket 90 opens and does not exert any friction on the sleeve 18. The liquid contained in the tubular passage 22 ensures the seal of the pump.

The sealing device according to the invention could be mounted on existing pumps. It could also be provided on compressors, steam turbines and other apparatus.

We claim:

1. Sealing device for a rotary machine containing hydraulic fluid of the type comprising a casing, a shaft leaving said casing at at least one point of the latter and an annular gasket/valve (24) provided with a flexible lip, whereof one side is turned towards the suction side of the pump and which presses normally with sealed contact around the shaft when the pump is inoperative, characterised in that it comprises an annular sealing chamber (30) defined between the shaft 14 and a casing part, said sealing chamber being connected, on the one hand, to the side of the gasket lip opposite the first said side and, on the other hand, to an annular cavity (52) defined inside a hollow rotary body (20) fixed in a sealed manner around the end of the shaft to be sealed and fitting with clearance around the casing, valve means (44) being provided for connecting the delivery side (40) of the pump to said sealing chamber (30) when the pump rotates at normal speed in order that said sealing chamber is permanently filled with liquid at a pressure equal to that of the delivery pressure, such that the gasket/valve (24) is separated from the shaft and that a leakage flow is delivered to said cavity (52) of the rotary body (20) where it forms a liquid ring (70) pressed under the effect of the centrifugal force against the outer periphery of said cavity, recovery means (48) being provided for keeping the depth of said liquid ring constant and for restoring the excess liquid to said sealing chamber as well as for maintaining said sealing chamber at a pressure greater than that of the suction pressure of the pump.

2. Sealing device according to claim 1, characterised in that said recovery means is constituted by a Pitot tube (48) having a collecting end (50) immersed in the peripheral liquid ring (70) and facing the direction of rotation of said liquid ring and an outlet end which opens out inside said sealing chamber (30).

3. Sealing device according to claim 1, characterised in that said casing part is constituted by a sleeve 18 fixed to the casing and coaxial with the shaft (14), the bore of said sleeve having a diameter greater than that of the shaft in order to define a tubular passage (22) closed off at one end of the sleeve by said gasket/valve (24) and terminating at the other end in said sealing chamber 30, which is limited by a diaphragm (32) whose diameter is slightly greater than that of the shaft in order to facilitate the flow of a leakage from said sealing chamber towards said annular cavity (52) of the rotary body.

4. Sealing device according to claim 3, characterised in that the rotary body (20) and the sleeve (52) define a zig-zag passage (66) having a high pressure drop downstream of said diaphragm (32), which passage limits the leakage flows towards the cavity (52) of the rotary body.

5. Sealing device according to claim 1, characterised in that said annular sealing chamber (30) is connected by a channel (36) provided in the sleeve (18) to a pipe (42) connected to the delivery side (40) of the pump, through the intermediary of said valve (44).

6. Sealing device according to claim 1, characterised in that said rotary body (20) is composed of a first cup-shaped part (54) and a second part (56) in the form of a ring, both of which are coaxial to the shaft (14) and provided with ribs on their periphery for the entrainment of the liquid ring, the first part being fixed to the shaft in a sealed manner and the second part being connected in a sealed manner by its outer periphery to the first part, the inner periphery of the second part fitting with clearance around the sleeve (18).

7. Sealing device according to claim 1, in the case where the suction pressure is negative, characterised in that said casing part is constituted by a sleeve (18) fixed to the casing and coaxial to the shaft (14) and the bore of which is limited at its two ends by diaphragms (32,80) whose diameter is slightly greater than that of the shaft and in that the liquid is sent directly from the delivery side (40) of the pump to the cavity (52) of the rotary body (20) through a channel (82) provided in the sleeve and through the intermediary of a nozzle (84) whose orifice is controlled by an adjustable spring strip (86) with adjusting screws (88).

8. Sealing device according to claim 7, characterised in that the inner periphery of said second part (56) is provided with a gasket (90) having a resilient lip (92) gripping the shaft (14) when the machine is stationary, said lip being provided on its circumference with a plurality of balls (94) which, under the action of centrifugal force during rotation of the pump, raise the lip, thus releasing the shaft.

* * * * *